(12) United States Patent
Höglund et al.

(10) Patent No.: US 11,818,761 B2
(45) Date of Patent: Nov. 14, 2023

(54) IMPLICIT TEMPORAL NETWORK ACCESS LOAD DISTRIBUTION

(71) Applicant: Telefonaktiebolaget LM Ericsson (publ), Stockholm (SE)

(72) Inventors: Andreas Höglund, Solna (SE); Johan Bergman, Stockholm (SE); Olof Liberg, Stockholm (SE); Yutao Sui, Solna (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 130 days.

(21) Appl. No.: 16/763,281

(22) PCT Filed: Nov. 9, 2018

(86) PCT No.: PCT/EP2018/080800
§ 371 (c)(1),
(2) Date: May 12, 2020

(87) PCT Pub. No.: WO2019/092196
PCT Pub. Date: May 16, 2019

(65) Prior Publication Data
US 2020/0314910 A1 Oct. 1, 2020

Related U.S. Application Data
(60) Provisional application No. 62/585,249, filed on Nov. 13, 2017.

(51) Int. Cl.
*H04W 4/00* (2018.01)
*H04W 74/08* (2009.01)
(Continued)

(52) U.S. Cl.
CPC ....... *H04W 74/0833* (2013.01); *H04L 1/1642* (2013.01); *H04W 48/10* (2013.01); *H04W 72/0446* (2013.01)

(58) Field of Classification Search
CPC ............. H04W 74/0833; H04W 48/10; H04W 72/0446; H04L 1/1642
See application file for complete search history.

(56) References Cited

U.S. PATENT DOCUMENTS 9,661,663 B1    5/2017  Lin et al.
10,142,962 B2 * 11/2018  Lee ....................... H04W 24/02
(Continued)

FOREIGN PATENT DOCUMENTS

WO    2017065468 A1    4/2017

OTHER PUBLICATIONS

3rd Generation Partnership Project, "Technical Specification Group Services and System Aspects; Service accessibility (Release 15)", 3GPP TS 22.011 V15.2.0, Sep. 2017, pp. 1-32.
(Continued)

*Primary Examiner* — Siren Wei
(74) *Attorney, Agent, or Firm* — COATS & BENNETT, PLLC

(57) ABSTRACT

The load on Random Access channels (N)PRACH (i.e., Msg1) is temporally distributed, to better handle synchronized access peaks from machine type devices. Access attempts by wireless devices are distributed in time, based on their identities (e.g., IMSI, which is used for the distribution of paging load) or random draw. The distribution restricts when 5 wireless devices can access the network, either based on System Frame Number or on random access occurrence. The method is implicit, i.e., after the initial System Information (SI) acquisition, wireless devices will automatically apply temporal network access load distribu-
(Continued)

tion according to the configuration provided in SI without any need for explicit signaling or re-acquisition of SI. Embodiments of the invention may be advantageously applied to any wireless 10 communication network supporting machine type communications, such as GPRS/EGPRS/ECGSM-IoT and UMTS/HSPA, as well as non-3GPP radio access technologies such as LoRa, Sigfox, and Ingenu.

18 Claims, 15 Drawing Sheets

(51) Int. Cl.
*H04L 1/1607* (2023.01)
*H04W 48/10* (2009.01)
*H04W 72/0446* (2023.01)

(56) References Cited

U.S. PATENT DOCUMENTS

| | | | |
|---|---|---|---|
| 2012/0033613 A1 | 2/2012 | Lin et al. | |
| 2012/0281679 A1* | 11/2012 | Fan | H04W 74/008 370/336 |
| 2013/0121303 A1* | 5/2013 | Cho | H04W 74/0833 370/329 |
| 2017/0105127 A1* | 4/2017 | Xiong | H04W 64/006 |
| 2017/0150523 A1* | 5/2017 | Patel | H04W 74/008 |

OTHER PUBLICATIONS

3rd Generation Partnership Project, "Technical Specification Group Radio Access Network; Physical layer procedures (FDD) (Release 15)", 3GPP TS 25.214 V15.0.0, Sep. 2017, pp. 1-141.
3rd Generation Partnership Project, "Technical Specification Group Core Network and Terminals; Non-Access-Stratum (NAS) functions related to Mobile Station (MS) in idle mode (Release 14)", 3GPP TS 23.122 V14.4.0, Sep. 2017, pp. 1-54.
3rd Generation Partnership Project, "Technical Specification Group Radio Access Network; Evolved Universal Terrestrial Radio Access (E-UTRA); Physical channels and modulation (Release 14)", 3GPP TS 36.211 V14.4.0, Sep. 2017, pp. 1-197.
3rd Generation Partnership Project, "Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, pp. 1-753.
3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.4.0, Sep. 2017, pp. 1-329.

* cited by examiner

IMPLICIT TEMPORAL NETWORK ACCESS LOAD DISTRIBUTION

RELATED APPLICATIONS

The application claims priority to U.S. Provisional Patent Application Ser. No. 62/585,249, titled Implicit (N)PRACH Load Distribution, filed 13 Nov. 2017.

TECHNICAL FIELD

The present invention relates generally to wireless communication networks, and in particular to temporal load distribution of network access procedures by wireless devices.

BACKGROUND

The Background section of this document is provided to place embodiments of the present invention in technological and operational context, to assist those of skill in the art in understanding their scope and utility. Approaches described in the Background section could be pursued but are not necessarily approaches that have been previously conceived or pursued. Unless explicitly identified as such, no statement herein is admitted to be prior art merely by its inclusion in the Background section.

Machine type communication (MTC) is a class of wireless connectivity for devices which communicate without human interaction. That is, providing cellular connectivity for the Internet of Things (IoT). It is predicted to increase the number of connections exponentially more than the increase of human subscriptions and the number of fixed connections. This is sometimes referred to as 'the networked society.' Because of the different nature of MTC devices, the requirements are also different from those of human-oriented traffic, such as smart phones. MTC devices need to have low cost, which is achieved by low User Equipment (UE) complexity and reduced capabilities (one receiving antenna, a narrow device bandwidth smaller than the system bandwidth, etc.). The power consumption should further be low in order to prolong battery life such that interactive battery charging is not required, preferably throughout the life span of the device. To be able to reach devices in challenging location, e.g., basements, it is desirable to enhance coverage in comparison to normal systems. In Rel-13 three different radio access technologies were introduced for this purpose in 3GPP; LTE-MTC, NB-IoT, and EC-GSM. In addition to Third Generation Partnership Project (3GPP) technologies, there are a number of IoT solutions designed for unlicensed band operation. These include LoRa, Sigfox, and Ingenu.

LTE-M

For LTE-MTC (here also referred to LTE-M or eMTC for any release), although some features for MTC were introduced already in Rel-11 (Enhanced Access Class Barring, EAB), and Rel-12 (Cat-0), the main changes of reduced device bandwidth support and coverage enhancements (CE) were introduced in Rel-13 for UE Cat-M1. CE support of up to 15 dB is achieved by time repetition in a Transmission Time Interval (TTI) bundling manner, similar to that introduced for Voice over Internet Protocol (VoIP) in Rel-8. In Rel-8, TTI bundling is limited to the uplink shared data channel and fixed to 4 repetitions. For Rel-13 MTC UEs requiring coverage enhancements, the number of repetitions can be configured per cell or per UE and will also be applied to the downlink. Up to 2048 repetitions for Physical Uplink Shared Channel (PUSCH) and Physical Downlink Shared Channel (PDSCH) support CE even larger than that of the initial 15 dB design target. For random access (RA), 4 different CE-levels were introduced, i.e. 4 different Physical Random Access Channel (PRACH) configurations with different repetition levels. The UE selects a PRACH resource with a CE-level matching its coverage requirement based on Reference Signal Received Power (RSRP) measurement.

In Rel-12 a lower complexity (LC) UE category (Cat-0) was introduced to support lower manufacturing costs for MTC devices. In Rel-13 further complexity reductions were introduced, where the largest change was a reduced device bandwidth to 6 Physical Resource Blocks (PRBs), or 1.4 MHz. This means that some legacy channels such as the downlink control channel (PDCCH), which spans over the entire system bandwidth, cannot be received. For these low complexity UEs (Cat-M0) the PDCCH, replaced with a MTC PDCCH, or MPDCCH, signal transmitted only within 6 PRBs. The lower complexity of the devices means that a small number of repetitions might be needed also for these devices in normal coverage, i.e., to compensate for the losses from using only one receiving antenna, loss of frequency diversity, etc. Further, as part of the complexity reduction and CE, cross-subframe scheduling is used. That is, a transmission is first scheduled by repetitions on MPDCCH and then the repetitions of the actual data transmission (PUSCH or PDSCH) are carried out at first after the final MPDCCH repetition.

Two types of CE modes were introduced in Rel-13: CE mode A supporting a small number of repetitions (up to 32 for shared data channels), and CE mode B supporting a large number of repetitions (up to 2048 for shared data channels). In practice, whether the UE is configured with CE mode A or B will mean it used different configurations for, e.g., Random Access, MPDCCH monitoring, PDSCH transmissions, etc. That is, different search spaces and frequency hopping parameters apply. For Random Access the four CE levels are divided such that CE-level 0 and CE-level 1 use CE mode A configuration, whereas the higher CE-levels 2 & 3 use CE mode B configuration.

In Rel-14 LTE-M was further enhanced with a number of features and the introduction of a wider bandwidth UE category, Cat-M2, supporting higher data rates with a bandwidth of 5 MHz or 24 PRBs.

NB-IOT

NB-IoT was introduced in 3GPP in Release 13 and supports enhancements to support Machine-Type Communications (MTC) with a new radio interface (and UE categories Cat-NB1 and Cat-NB2). (The notation NB-IoT is here used for any Release).

For NB-IoT, three different operation modes are defined, i.e., stand-alone, guard-band, and in-band. In stand-alone mode, the NB-IoT system is operated in dedicated frequency bands. For in-band operation, the NB-IoT system can be placed inside the frequency bands used by the current LTE system, while in the guard-band mode, the NB-IoT system can be operated in the guard band used by the current LTE system. NB-IoT can operate with a system bandwidth of 180 kHz (Cat-NB1, Cat-NB2). NB-IoT supports multi-carrier operation, where several 180 kHz PRBs can be used, e.g., for increasing the system capacity, inter-cell interference coordination, load balancing, etc. The NB-IoT device listens to the system information on the anchor carrier, but when there is data, the communication can be moved to a secondary carrier. Rel-13 UEs need to use the anchor carrier for random access whereas Rel-14 UEs may use the non-anchor carriers if configured. Otherwise, such as when attempting to access the network for attach, Rel-14 UEs also need to use the anchor carrier.

Anchor carrier configuration, such as the radio resource configuration, uplink carrier frequency, random access parameters, paging configuration, and the static physical layer parameters, are done in SIB2-NB while non-anchor carriers are configured by SIB22-NB. The parameter maxNonAnchorCarriers-NB-r14 defines the maximum number of non-anchor carriers supported in Release 14; the maximum is 15 in addition to the anchor carrier.

According to 3GPP TS 36.300 v. 14.4.0, the UE in RRC_CONNECTED mode can be configured, via UE-specific Radio Resource Control (RRC) signaling, to a non-anchor carrier, for all unicast transmissions. The UE in RRC_IDLE mode, based on broadcast signaling, can use a non-anchor carrier for paging reception and/or PRACH access. If the non-anchor carrier is not configured for the UE, all transmissions occur on the anchor carrier.

NB-IoT uses repeated transmissions to extend its coverage compared to earlier supported 3GPP radio access technologies. When accessing the system, a UE may for example repeat the Narrowband Physical Random Access Channel (NPRACH) preamble transmission up to 128 times to achieve coverage in the most demanding situations. The NB-IoT radio interface has therefore been designed with three separate NPRACH radio resources that each is associated with a coverage range and a set of repetitions. That is, CE-levels 0, 1, and 2 are supported, unlike eMTC which supports 4. The UE selects the CE-level and NPRACH resource in the same manner based on RSRP measurements.

FIG. 1 illustrates a typical NPRACH configuration with three resources for Coverage Enhancement level 0 (CE0), 1 (CE1) and 2 (CE2). The left most NPRACH resource (CE0) is intended for UEs in good radio conditions, where the random access preamble is sent a single time. The system may configure two additional NPRACH resources to be used by UEs in extended and extreme coverage. Each NPRACH resource is associated with a Coverage Extension (CE) level. A CE level is furthermore associated with a set of repetitions of the random access preamble transmission. The number of repetitions increases with the coverage intended to be supported by the NPRACH resource. For example, FIG. 1 depicts CE1 spanning 12 subcarriers and comprising (up to) 8 repetitions. In a more severe environment, CE2 also spans 12 subcarriers, but comprises up to 32 repetitions.

To select a NPRACH resource, the UE measures the downlink received power (RSRP) and based on this and a set of broadcasted signal level thresholds, makes a selection of the NPRACH resource to use for its system access, i.e. the number of times the random access frequency hopping symbol group should be repeated.

Non-3GPP Solutions

LoRa, Sigfox, and Ingenu are three wide-area IoT solutions that have been deployed in certain markets. These solutions are very uplink-oriented, as they can work even without a downlink. They can also work without the frame structure, i.e. no notion of subframe, frame, hyperframe, etc. In these systems, a UE which has data to send can simply send the data without any uplink grant. Such uplink grant-free access is vulnerable to potential collision at high traffic loads. Furthermore, in these systems, the uplink data is transmitted in Msg1.

Network Access Congestion

For MTC, uplink transmissions are not user initiated but instead initiated by the software running in the device or triggered by events, e.g. from sensor readings in the device. Since large numbers of devices will be running the same software, or are triggered by the same event, there is a large risk for synchronized access peaks. That is, a large number of UEs will attempt to access the network at the same time leading to congestion and poor performance.

SUMMARY

The following presents a simplified summary of the disclosure in order to provide a basic understanding to those of skill in the art. This summary is not an extensive overview of the disclosure and is not intended to identify key/critical elements of embodiments. The sole purpose of this summary is to present some concepts disclosed herein in a simplified form as a prelude to the more detailed description that is presented later.

According to some embodiments, the PRACH or NPRACH (together referred to herein as (N)PRACH) load (i.e., Msg1) is temporally distributed, to better handle synchronized access peaks from machine type devices. Access attempts by UEs are distributed in time, based on their UE identities (e.g., International Mobile Subscriber Identity, or IMSI, which is used for the distribution of paging load) or random draw. The distribution restricts when UEs can access the network, either based on System Frame Number (SFN) or on random access occurrence. The method is implicit, i.e., after the initial System Information (SI) acquisition, UEs will automatically apply access load distribution according to the configuration provided in SI without any need for explicit signaling or re-acquisition of SI. Although embodiments are described herein in terms of NB-IoT and LTE-M implementations, the invention is not so limited, and may be advantageously applied to any wireless communication network supporting machine type communications, such as GPRS/EGPRS/EC-GSM-IoT and UMTS/HSPA, as well as non-3GPP radio access technologies such as LoRa, Sigfox, and Ingenu.

One embodiment relates to a method performed by a wireless device for performing a temporally distributed network access procedure on an uplink carrier to access a wireless communication network. Network access configuration information, broadcast from the network, is received. An uplink carrier, on which to transmit network access signalling, is selected. A plurality of access opportunities, in the time domain, on which network access signalling is possible on the selected uplink carrier is determined. Based on the network access configuration information and one of a parameter of the wireless device and a random parameter, a subset of the plurality of possible access opportunities in which the wireless device is permitted to transmit network access signalling on the selected uplink carrier is determined. Network access signalling is transmitted on the selected uplink carrier only during the subset of permitted access opportunities.

Another embodiment relates to a wireless device operative to perform a temporally distributed network access procedure on an uplink carrier to access a wireless communication network. The wireless device includes communication circuitry and processing circuitry operatively connected to the communication circuitry. The processing circuitry is operative to receive network access configuration information broadcast from the network; select an uplink carrier on which to transmit network access signalling; determine a plurality of access opportunities, in the time domain, in which it is possible to transmit network access signalling on the selected uplink carrier; based on the network access configuration information and one of a parameter of the wireless device and a random parameter, determine a subset of the plurality of possible access opportunities in which the wireless device is permitted to transmit network access signalling on the selected uplink carrier; and transmit network access signalling on the selected uplink carrier only during the subset of permitted access opportunities.

Yet another embodiment relates to a method of temporal network access load distribution, performed by a base station operative in a communication network in which a wireless device seeks access to the network on an uplink carrier. Network access configuration information is broadcast. Network access signalling is received from the wireless device, on the uplink carrier, only during a subset of a plurality of possible access opportunities, in the time domain, in which the wireless device is permitted to perform access, the subset determined by the wireless device.

Still another embodiment relates to a base station operative in a communication network in which a wireless device seeks access to the network on an uplink carrier, and further operative to perform temporal load distribution. The base station includes communication circuitry and processing circuitry operatively connected to the communication circuitry. The processing circuitry is operative to broadcast network access configuration information; and receive, on the uplink carrier, network access signalling from the wireless device only during a subset of a plurality of possible access opportunities, in the time domain, in which the wireless device is permitted to perform access, the subset determined by the wireless device.

Still another embodiment relates to a computer product comprising machine-executable code. When executed by processing circuitry of a wireless device performing a temporally distributed network access procedure on an uplink carrier to access a wireless communication network, the machine-executable code is operative to cause the processing circuitry to receive network access configuration information broadcast from the network; select an uplink carrier on which to transmit network access signalling; determine a plurality of access opportunities, in the time domain, in which it is possible to transmit network access signalling on the selected uplink carrier; based on the network access configuration information and one of a parameter of the wireless device and a random parameter, determine a subset of the plurality of possible access opportunities in which the wireless device is permitted to transmit network access signalling on the selected uplink carrier; and transmit network access signalling on the selected uplink carrier only during the subset of permitted access opportunities.

Still another embodiment relates to a computer product comprising machine-executable code. When executed by processing circuitry of a base station operative in a communication network in which a wireless device seeks access to the network on an uplink carrier, and further operative to perform temporal network access load distribution, the machine-executable code is operative to cause the processing circuitry to broadcast network access configuration information; and receive, on the uplink carrier, network access signalling from the wireless device only during a subset of a plurality of possible access opportunities, in the time domain, in which the wireless device is permitted to perform access, the subset determined by the wireless device.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
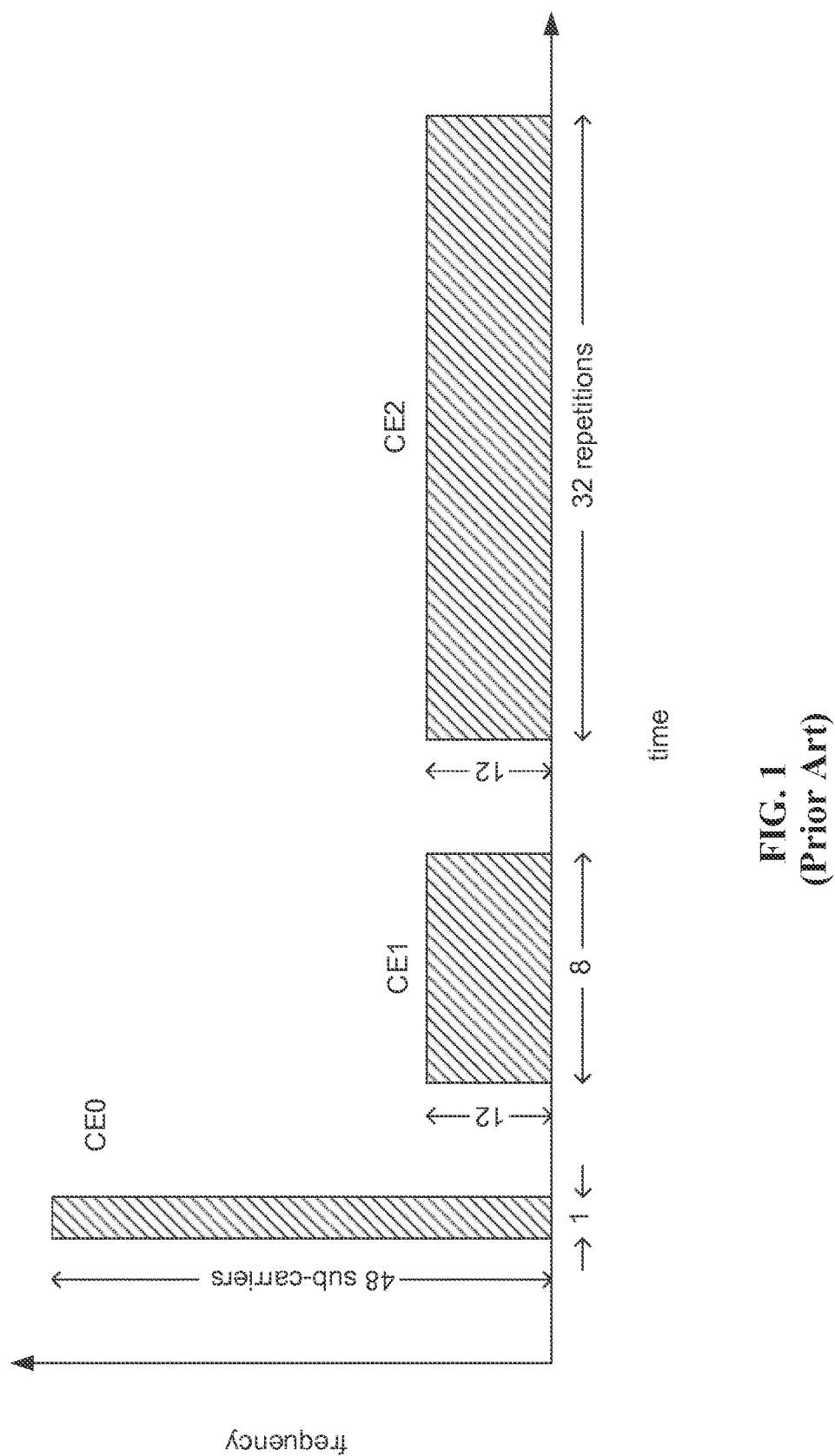
FIG. 1 is a time-frequency diagram depicting different coverage enhanced random access transmission patterns.
Figures 2A, 2B, 2C:
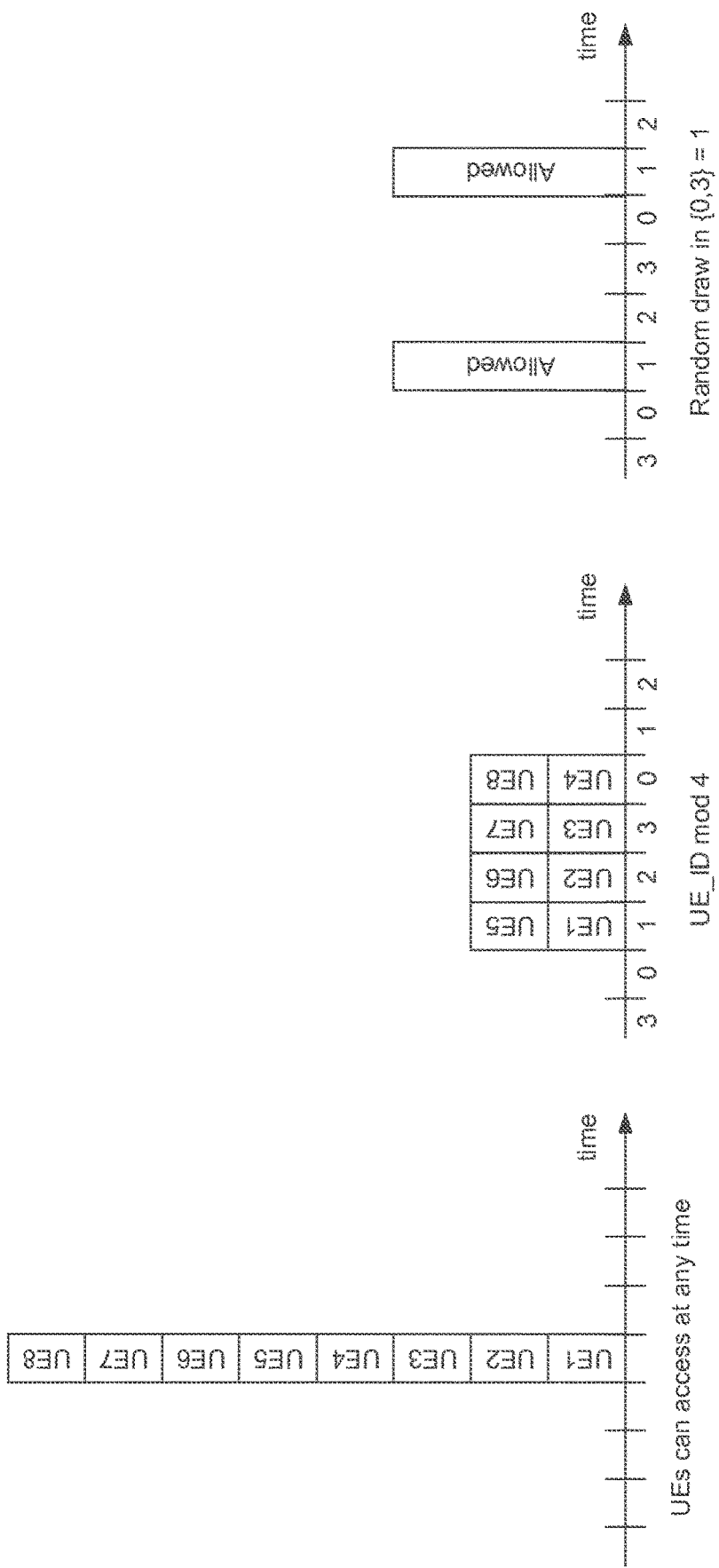
FIG. 2A is a diagram depicting eight UEs attempting to access a network simultaneously.
FIG. 2B is a diagram depicting the eight UEs with their network access attempts load balanced over four access opportunities according to an operation performed on the UE ID.
FIG. 2C is a diagram depicting allowable network access signaling opportunities for a UE according to a random draw.

Embodiments presented here comprise methods to spread the access load, i.e., Msg1 or (N)PRACH, in time when many UEs attempt to access the network simultaneously (or near-simultaneously), causing a synchronized access peak. They can be based on any UE property that differs, such as the UE_ID, e.g., pseudo-random SAE-Temporary Mobile Subscriber Identity (S-TMSI) or IMSI (the latter is currently used for distributing the paging load). An illustration of this concept is shown in FIGS. 2A and 2B. In FIG. 2A, eight UEs have network access triggered simultaneously, such as due to a commonly-experienced event, or common software, which could overload the eNB. However, under the temporal network access load distribution according to embodiments of the present invention, and as depicted in FIG. 2B, their network access signaling is spread over four access opportunities instead of one. This is achieved by restricting the access such that a UE can only transmit Msg1/(N)PRACH in certain access opportunities, as determined for example by a function of its UE identity. In this simple example, UE6 has UE_ID=6 and is only allowed to access opportunity 2 according to the following function: UE_ID mod 4=2. Note that the base station (e.g., eNB or gNB) would not necessarily need to be aware that the UE is applying this feature, but the UE would need some way to differentiate the periodic (N)PRACH occurrences. In some embodiments, this is an explicit indication in the (N)PRACH configuration information in SI. In practical cases, the access opportunity and the function are defined, as seen in the embodiments described herein.

NB-IoT NPRACH Periodicity

The NPRACH resource on the anchor carrier is defined by the Information Element (IE) NPRACH-ConfigSIB-NB (See 3GPP TS 36.331 V14.4.0). In this IE, all the NPRACH resources are configured, up to three, corresponding to CE-levels 0, 1, and 2. Corresponding RSRP thresholds are given for each CE level, in order for UEs to select the NPRACH resource with a number of repetitions suitable for the UE's coverage (RSRP thresholds are given by the IE rsrp-ThresholdsPrachInfoList-r13, and the number of repetitons in the range {n1, n2, n4, n8, n16, n32, n64, n128} by the IE numRepetitionsPerPreambleAttempt-r13). The reoccurrence of a NPRACH occurrence is defined by the IE nprach-Periodicity-r13 which has the range {ms40, ms80, ms160, ms240, ms320, ms640, ms1280, ms2560}, and the IE nprach-StartTime-r13 which has the range ms8, ms16, ms32, ms64, ms128, ms256, ms512, ms10241. More specifically, it is defined as follows by 3GPP TS 36.211 V14.4.0:

"NPRACH transmission can start only $N_{start}^{NPRACH} \cdot 30720 T_s$ time units after the start of a radio frame fulfilling $n_f \mod (N_{period}^{NPRACH}/10) = 0$."

That is nprach-Periodicity configures the periodicity of the NPRACH resource, and nprach-StartTime can provide a cell-specific time offset to reduce inter-cell interference.

eMTC PRACH Periodicity

For eMTC the NPRACH resources are configured by the Information Element (IE) PRACH-Config (See TS 36.331).

The Rel-13 extensions specify the behavior of Cat-M1 UEs and the use of repetitions for coverage enhancements. In the same way as for NB-IoT, rsrp-ThresholdsPrachInfoList-r13 defines the RSRP thresholds for the PRACH CE-level selection for the UE. The parameter PRACH-ParametersListCE specifies the configuration parameters for up to four CE-levels. For each PRACH resource a number of repetions in the range {n1,n2,n4,n8,n16,n32,n64,n128} is defined. Further, according to TS 36.211:

"For BL/CE UEs, for each PRACH coverage enhancement level, there is a PRACH configuration configured by higher layers with a PRACH configuration index (prach-ConfigurationIndex), a PRACH frequency offset $\bar{n}_{PRBoffset}^{RA}$ (prach-FrequencyOffset), a number of PRACH repetitions per attempt $N_{rep}^{PRACH}$ (numRepetitionPerPreambleAttempt) and optionally a PRACH starting subframe periodicity $N_{rep}^{PRACH}$ (prach-StartingSubframe)."

That is, unlike NB-IoT, the PRACH periodicity is determined by the prach-ConfigurationIndex. How PRACH is transmitted is indicated in Table 5.7.1-2 of TS 36.211. An extract for preamble format 0 is given below for better context:

TABLE 1

Extract of PRACH configuration index for preamble 0 from TS 36.211.

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |

As seen the PRACH periodicity ranges from 1 per 20 ms to 1 per ms. According to embodiments of the present invention, these subframes (possibly including prach-StartingSubframe) then define the access opportunities over which the PRACH load can be spread (i.e., for a given UE, only a subset of these subframes would be a valid).

UE ID Based

In a (N)PRACH based embodiment of the invention, when (N)PRACH load distribution is configured, the UE considers only a subset of the (N)PRACH occurrences as valid. For eMTC, this means a reinterpretation of the prach-ConfigurationIndex such that only a subset of the indicated subframes are valid, or a further differentiation of radio frame such that {even, odd} radio frames are extended to, e.g., SFN mod 4={0,1,2,3} for spreading over the subframes in 4 radio frames (i.e. even, odd is the same as SFN mod 2={0,1}). This can be generalized to any number of radio frames. The remaining step is to map which UEs use which subset of the access opportunities/PRACH occurrences. In one embodiment, this is determined by the number of occurrences over which the load should be spread. For example, if it is 4, the access opportunities/PRACH occurrences are first indexed from 0 to 3 as described above, then UEs for which UE_ID mod 4=m are allowed to access only in occurrences with access opportunity/PRACH occurrence index equal to m. UE_ID could be any (quasi) random UE identity used in the network, e.g., S-TMSI or IMSI. In one embodiment, IMSI is used, since it is known in the eNB already and random enough for providing even paging load distribution in existing standard and networks.

For NB-IoT a similar approach is applied. More specifically, the different NPRACH periods are indexed according to the nprach-Periodicity. That is, the following expression will index each NPRACH period within the SFN period:

Floor(SFN/(nprach−Periodicity/10))=index_allPeriods

For example, if nprach-Periodicity=2560 ms, since SFN range from radioframe 0 to radioframe 1023, the NPRACH periods will be index {0,1,2,3} before SFN wrap-around, when it starts over. Since this is the longest NPRACH period, there will likely be more indexes for shorter periods than occurrences over which the NPRACH load is to be distributed. Applying a modulus operation on the above will instead ensure that NPRACH occurrences are only indexed up to the number of distribution groups, and the wrapped-around (i.e. periodically restarted):

Mod(Floor(SFN/(nprach−Periodicity/10)))= index_prachGroups

The remaining step of deciding which prach group index are allowed for a UE, based on the UE_ID, is the same as described for eMTC above.

In another embodiment, instead of starting with the configured number of (N)PRACH occurrences over which the load should be distributed, the method starts by defining/configuring the length of the spreading period. i.e., due to requirements on maximum delay that could be of interest. This approach is similar to that outlined above, with the main difference being that the number of PRACH groups/occurrences over which the load is spread depends on the (N)PRACH periodicity, i.e. on prach-ConfigurationIndex or nprach-Periodicity.

Access Class Based

A UE Subscriber Identity Module (SIM) or Universal SIM (USIM) is configured with a random access class in the range 0 to 9 and may in addition be configured with one special access class selected from the range 11 to 15. The meanings of the special classes are presented in Table 2.

TABLE 2

3GPP special access classes
(see 3GPP TS 22.011 V15.2.0).

| Class | Function |
|---|---|
| 11 | For PLMN Use |
| 12 | Security Services |
| 13 | Public Utilities (e.g. water/gas suppliers) |
| 14 | Emergency Services |
| 15 | PLMN Staff |

In one embodiment, the selected random access occurrence is based on the random access class instead of the UE ID. In another embodiment, the selected random access occurrence and its periodicity is selected based on the special access class configuration. In yet another embodiment, the activation of the functionality described herein is based on the special access class configuration. These embodiments are not limited to the currently specified set of special access classes presented in Table 2.

PLMN Based

Multiple operators may share the same radio access network but have different core network implementations. While some operators may wish to spread the access load over time as described herein, others may not see the same need. In one embodiment, the activation of this feature is hence made dependent on the PLMN used by the UE.

Access Establishment Caused Based

A number of access establishment causes are supported. The LTE and NB-IoT RRC specifications present access causes such as 'emergency', 'high priority', and 'delay tolerant'. In one embodiment, the activation and configuration of the features described herein are dependent on the access establishment cause.

NB-IoT Reporting Type Based

For NB-IoT, two types of UE reporting are defined: 'normal reporting' and 'exception reporting'. In one embodiment, the activation and configuration of the feature described herein is dependent on the NB-IoT reporting type.

Randomized

Unlike paging, the eNB does not necessarily need to know in which access opportunities/(N)PRACH occurrences the UE is allowed to access. It may be beneficial to have such information, for example, to control the UE, ensure that its behavior is standard-compliant, and prevent access when the UE should not. However, if this is not the case, the eNB could in some cases be unaware of whether a UE is using the feature. In that case, the access opportunity/(N)PRACH occurrence in which the UE is allowed to access could be determined by random draw. This is illustrated in FIG. 2C, where the access opportunity/(N)PRACH load is spread over four occasions and the UE draws a random number equal to three. It is therefore allowed to access only in access opportunities/(N)PRACH occurrences with periodic index equal to three. The periodic index can either be explicit, e.g., indicated in the (N)PRACH configuration, or implicit, e.g., indexed periodically depending on the configuration parameter which determines how many access opportunities/(N)PRACH occurrences over which the UE should be load distributed. In an example of the latter, if the load is spread over 8 access opportunities/(N)PRACH occurrences, they would be labeled with index {0,1,2,3,4,5,6,7} where the first access opportunities/(N)PRACH in a system frame number (SFN) period starts with index 0, i.e., the first in the radio frame for which SFN=0 (this will uniquely give periodical index in the entire range SFN 0 to 1023). Hyper-SFN could be used in a similar way. For eMTC, in one embodiment the PRACH occurrences are identified by the subframe, such that e.g. for prach-ConfigurationIndex=14 the occurrences are indexed from 0 to 19, where the first PRACH subframe 0 in an even SFN would be given PRACH index 0 (and hence subframe 9 in an odd SFN given PRACH index 19). Since some PRACH configurations only have one or a few subframes indicated, in some embodiments the indexing is extended over several radio frames (as in the (N)PRACH based case above) such that SFN mod N={0, 1, 2, ..., N−1}, where N is the number of radio frames over which the access is spread.

In short, the indexing works exactly as described above under '(N)PRACH-based,' but the UE selection of an occurrence is based on UE_ID but instead on a random draw in the range of indexes for the (N)PRACH distribution group indexes. In one embodiment the UE does the random-draw per access attempt; in another embodiment it persists over a longer period of time.

There is a Universal Mobile Telecommunications System (UMTS) physical random access procedure (3GPP TS 25.214 V15.0.0, § 6.1) which specifies a randomization across PRACH access slots:

1 Derive the available uplink access slots, in the next full access slot set, for the set of available RACH sub-channels within the given ASC with the help of sub-clauses 6.1.1. and 6.1.2. Randomly select one access slot among the ones previously determined. If there is no access slot available in the selected set, randomly select one uplink access slot corresponding to the set of available RACH sub-channels within the given ASC from the next access slot set. The random function shall be such that each of the allowed selections is chosen with equal probability.

Also, the Access Class Barring (ACB) in LTE defines a threshold for random draw (in SystemInformationBlockType2):

| | |
|---|---|
| AC-BarringConfig ::= | SEQUENCE { |
| ac-BarringFactor | ENUMERATED { |
| | p00, p05, p10, p15, p20, p25, p30, p40, |
| | p50, p60, p70, p75, p80, p85, p90, p95}, |
| ac-BarringTime | ENUMERATED {s4, s8, s16, s32, s64, |
| s128, s256, s512}, | |
| ac-BarringForSpecialAC | BIT STRING (SIZE(5)) |
| } | |

| SystemInformationBlockType2 field descriptions |
|---|
| ac-BarringFactor |
| If the random number drawn by the UE is lower than this value, access is allowed. Otherwise the access is barred. The values are interpreted in the range [0, 1): p00 = 0, p05 = 0.05, p10 = 0.10, . . . , p95 = 0.95. Values other than p00 can only be set if all bits of the corresponding ac-BarringForSpecialAC are set to 0. |
| ac-BarringTime |
| Mean access barring time value in seconds. |

The specification text is as follows:
1>if timer T302 or "Tbarring" is running:
  2>consider access to the cell as barred;
1>else if SystemInformationBlockType2 includes "AC barring parameter":
  2>if the UE has one or more Access Classes, as stored on the USIM, with a value in the range 11 . . . 15, which is valid for the UE to use according to TS 22.011 [10] and TS 23.122 [11], and
NOTE: ACs 12, 13, 14 are only valid for use in the home country and ACs 11, 15 are only valid for use in the HPLMN/EHPLMN.
  2>for at least one of these valid Access Classes the corresponding bit in the ac-BarringForSpecialAC contained in "AC barring parameter" is set to zero:
    3>consider access to the cell as not barred;
  2>else:
    3>draw a random number 'rand' uniformly distributed in the range: 0≤rand<1;
    3>if 'rand' is lower than the value indicated by ac-BarringFactor included in "AC barring parameter":
      4>consider access to the cell as not barred;
    3>else:
      4>consider access to the cell as barred;
1>else:
  2>consider access to the cell as not barred;
1>if access to the cell is barred and both timers T302 and "Tbarring" are not running:
  2>draw a random number 'rand' that is uniformly distributed in the range 0≤rand<1;
  2>start timer "Tbarring" with the timer value calculated as follows, using the ac-BarringTime included in "AC barring parameter":
    "Tbarring"=(0.7+0.6*rand)*ac-BarringTime;

According to one embodiment, for a fully randomized solution, differentiation for the barring is for any of the following, or any combination thereof:
  a) MTC UEs (Cat-M, Cat-NB) vs. MBB UEs (for LTE it always applies to both).
  b) Access classes (see Section 0)
  c) Based on traffic type.
  d) Based on UE type.
  e) Based on subscription type.
  f) Based on latency requirement, QoS or QCI (QoS Class Indicator).
  g) Based on Establishment Cause (e.g. 'delay tolerant', see Section 0).
  h) Based on PLMN (see Section 0).
  i) Based on NB-IoT reporting type (see Section 0)
  j) Based on CE-level (see Section 0).

In addition, in some embodiments the random selection is biased for any of the above criteria. E.g., weights are used to have a non-uniform random selection for the above. For example, some UE category, home PLMN, or QCI may be prioritized.

SFN Based

In another embodiment, the access opportunities are not defined as different (N)PRACH occurrences, but rather a time period and all the (N)PRACH occurrences therein belong to the same access opportunity and have the same access opportunity index. In one example, with N=4, it is based on SFN, such that SFN mod 4=0 is access opportunity 0, SFN mod 4=1 is access opportunity 1, SFN mod 4=2 is access opportunity 2, and SFN mod 4=3 is access opportunity 3. That is, radio frames are given access opportunity indexes 0,1,2,3,0,1,2,3,0,1, . . . and so on, and all (N)PRACH occurrences (with starting positing) in one 10 ms radio frame would only be valid to use for a UE which has selected that access opportunity index. As above, the UE access opportunity index selection based on UE_ID or random draw in different embodiments.

In general, any time period can be used, e.g. a radio frame (some overlap with the subframe-centric alternative described above for eMTC), Hyper-SFN, BCCH modification period, or any other time period.

Coverage Based

Before accessing the NB-IoT or LTE-M system, a UE is required to assess its coverage enhancement (CE) level. Based on this, it selects an (N)PRACH CE level. In one embodiment the configuration of the random access occurrence parameters (e.g. the periodicity) is dependent on the UE CE level. In another embodiment the selection of random access occurrence is dependent on the UE CE level.

Configurability

The (N)PRACH load distribution method described here will increase latency, since a UE may not be allowed to transmit in the first upcoming (N)PRACH occurrence when data arrives in its buffer but will have to wait somewhat for an allowed occurrence. In general, this is not a problem since most MTC applications are delay tolerant by nature, e.g., in high CE only the data part can take several seconds, so adding a number of milliseconds is not a concern in most cases (even for alarms, a latency on the order of seconds must be expected when using MTC). However, there may still be cases where it is not desirable to add to the already high latency, and therefore it is important to have configurability for the access methods described herein. Since any UE for which the (N)PRACH load distribution is not configured will use any access opportunity/(N)PRACH occurrence, there is no need to have a biased selection for the remaining UEs using the load distribution. E.g., if (N)PRACH load is spread over four access opportunities/(N)PRACH occurrences, the first UE will select any one of them, whichever comes first in time, and randomly distributing the remaining load for the other UEs will ensure an even load for the access opportunities/(N)PRACH occurrences (assuming there is no traffic pattern for the UEs not configured with the load distribution which correlates with the access opportunity/(N)PRACH occurrence periodicity).

Configuration per UE: In one embodiment, the configuration of (N)PRACH load distribution is UE-specific. That is, the eNB configures the UE to apply (N)PRACH load distribution or not, e.g., by dedicated RRC signaling. In one embodiment configuration is then valid in the current cell until re-configured. In another embodiment, the configuration is valid in the entire network, in which case, after configuring the UE with (N)PRACH load distribution, the eNB notifies the Mobility Management Entity (MME) about this configuration over S1-AP signaling for storing the UE context. In one embodiment, storage of the configuration is a Radio Access Network (RAN) feature. The configuration is either only stored in the UE context in MME for long-term keeping when the UE goes to RRC_IDLE; stored in the UE context when RRC Suspend/Resume solution is used (i.e., CIoT user-plane optimization); or only stored in the UE (a new eNB will have to poll the UE to receive the current configuration). In another embodiment, storage of the configuration is a MME feature, where the MME decides whether or not (N)PRACH load distribution is applied for a certain UE and notifies this to the UE over Non-Access Stratum (NAS) signaling. The eNB does not necessarily need to be informed in this case. In any of these embodiments, the decision for the configuration of (N)PRACH load distribution for a particular UE is based on any of the following (or combination thereof): UE subscription type, UE traffic profile, UE latency requirement, QoS/CQI typically used, UE application type, UE CE-level, (N)PRACH configuration in the cell, whether the UE is using the Rel-15 feature Early Data Transmission, etc. In one embodiment, the UE latency requirement is further application specific. Certain application may require the uplink data to be delivered within the next minute, hour, or day. To support various latency requirements, the operation of determining access opportunity for the UE, e.g., SFN mod N, may further have the value N be determined based on the application, or UE-dependent latency requirement.

Configuration per cell: It may be desirable to be able to switch access load distribution on and off depending on conditions, e.g., turning it on in certain cells or during certain times like busy hour. In one embodiment this is achieved by an indication in system information. The indication may be implicit from the inclusion of the (N)PRACH load distribution configuration. That is, UEs (all, or the ones for which the feature is configured, see above) apply (N)PRACH load distribution whenever its optional configuration parameters and information elements (IEs) are provided in system information. These configuration parameters and IEs are included in a SystemInformationBlock (SIB) and for example contain the following parameters: number of access opportunities/(N)PRACH occurrences over which UEs should be distributed, (N)PRACH periodic load distribution index, Rel-15 Early Data Transmission specific configuration, uplink time difference-of-arrival (UT-DOA positioning) specific configuration, multi-tone specific configuration, contention-based or contention-free random access differentiation, CE-level specific information, etc. Regarding the last example configuration parameter, at higher CE-level the transmission of Msg1 takes longer since a higher number of repetitions are used, and therefore it might be desirable to have the possibility to configure the different CE-levels differently.

Explicit Activation

Activation of the feature: In one embodiment, the configuration of the (N)PRACH load distribution can be done separately from activation of the feature. As mentioned above, the (N)PRACH load distribution can be configured either per-cell or per-UE. However, after this feature is configured, in some embodiments the eNB can choose to activate the (N)PRACH load distribution in a later stage when necessary. For example, the (N)PRACH load distribution may be configured in the SI, but the activation is done after the UE's first (N)PRACH attempts, i.e., in the random access response message. In this way, the effort of updating the SI is minimized, which reduce the efforts for the UEs to retrieve the updated SI in a cell. In some embodiments the (N)PRACH load distribution is also be activated at the same time when access barring is enabled in the cell. That is, when a UE noticed that if access barring is enabled in the cell, the system indicates the UE that are not barred should follow the (N)PRACH load distribution configurations. As access barring can be enabled quicker than updating the SI, this means the system can control the (N)PRACH load in a faster manner than updating the SI in the cell.

Extension to LoRa, Sigfox, and Ingenu

As mentioned above, LoRa, Sigfox, and Ingenu may operate without a system frame structure. Furthermore, they operate based on grant-free uplink access in the sense that a device can transmit its uplink data at any time. To address the problem caused by a load spike, in one embodiment a device randomizes its start transmission time based on $t_{start}=\text{rand}(N)T_s$, where N is an integer number which may be determined by the application or device specific latency requirement, rand(N) is a random number generator which generates an integer number between 0 to N−1 randomly, and Ts is a basic time unit, which may be, e.g., the symbol interval.

Methods and Apparatuses

Figure 3:
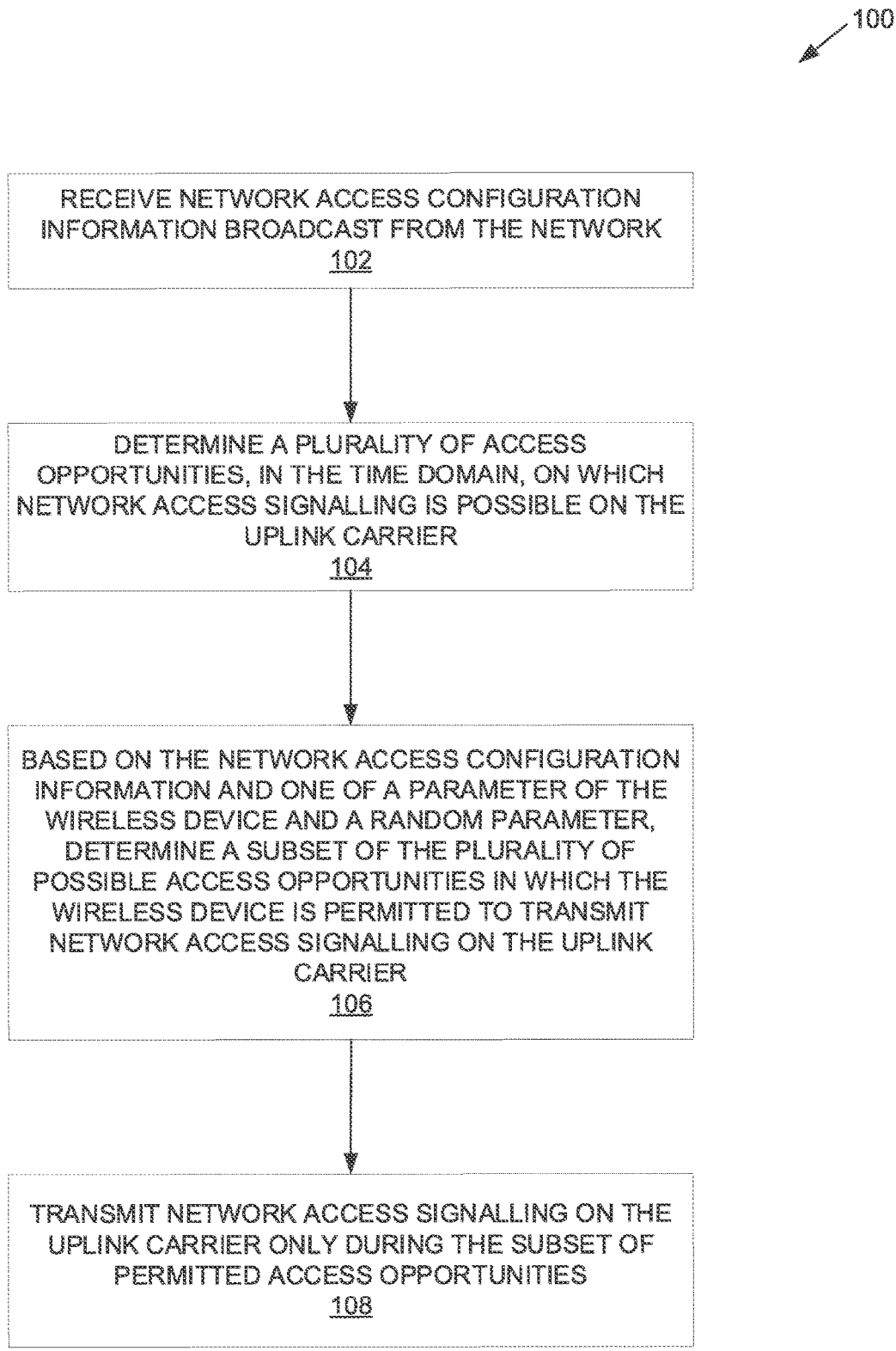
FIG. 3 is a flow diagram of a method performed by a wireless device for performing a temporally distributed network access procedure on an uplink carrier to access a wireless communication network.

FIG. 3 depicts a method 100, performed by a wireless device, for performing a temporally distributed network access procedure on an uplink carrier to access a wireless communication network, in accordance with particular embodiments. Network access configuration information, broadcast from the network, is received (block 102). A plurality of access opportunities, in the time domain, on which network access signalling is possible on the selected uplink carrier, is determined (block 104). Based on the network access configuration information and one of a parameter of the wireless device and a random parameter, a subset of the plurality of possible access opportunities in which the wireless device is permitted to transmit network access signalling on the selected uplink carrier is determined (block 106). Network access signalling is transmitted on the selected uplink carrier only during the subset of permitted access opportunities (block 108). In some embodiments, the method 100 further comprises selecting an uplink carrier on which to transmit the network access signalling (not shown).

Figure 4:
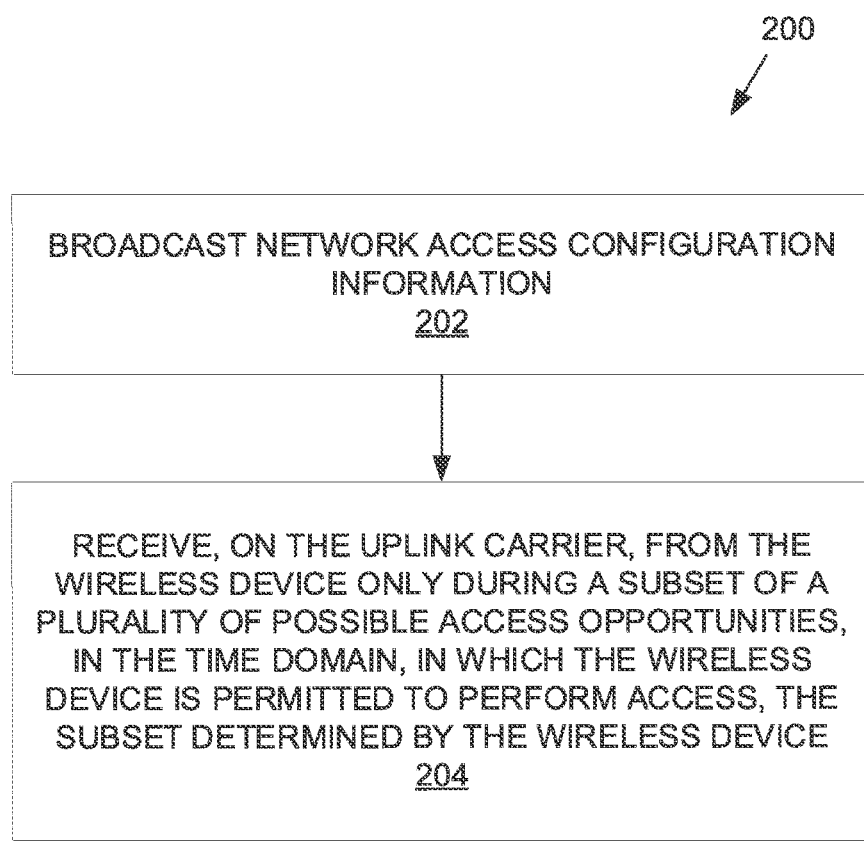
FIG. 4 is a flow diagram of a method of temporal network access load distribution, performed by a base station operative in a communication network in which a wireless device seeks access to the network on an uplink carrier.

FIG. 4 depicts a method 200 of temporal network access load distribution, performed by a base station operative in a communication network in which a wireless device seeks access to the network on an uplink carrier, in accordance with other particular embodiments. Network access configuration information is broadcast (block 202). Network access signalling is received on the uplink carrier from the wireless device only during a subset of a plurality of possible access opportunities, in the time domain, in which the wireless device is permitted to perform access, the subset determined by the wireless device (block 204).

The apparatuses described above may perform the methods 100, 200 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
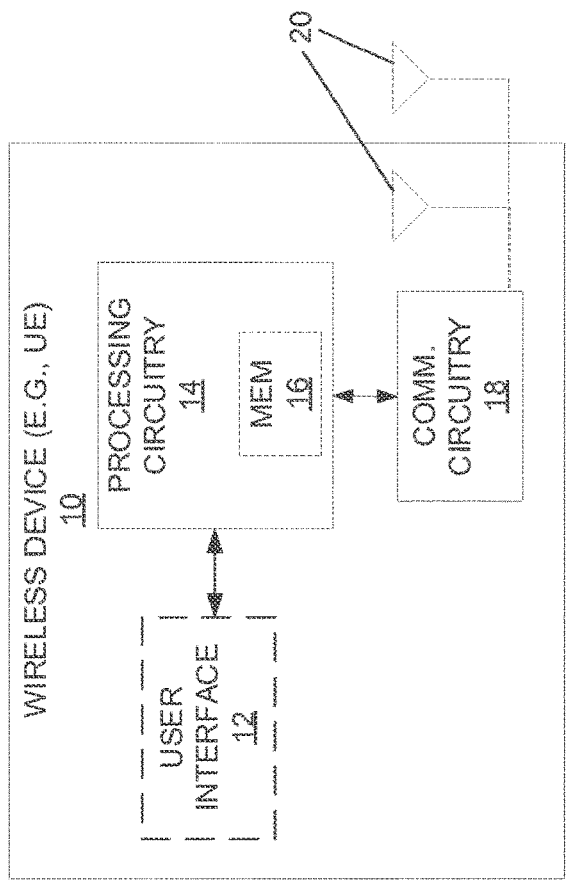
FIG. 5 is a block diagram of a wireless device.

FIG. 5 for example illustrates a wireless device 10 as implemented in accordance with one or more embodiments. A wireless device 10 is any type device capable of communicating with a network node and/or access point using radio signals. A wireless device 10 may therefore refer to a machine-to-machine (M2M) device, a machine-type communications (MTC) device, a Narrowband Internet of Things (NB IoT) device, etc. The wireless device 10 may also be referred to as a User Equipment (UE), such as a cellular telephone or "smartphone," however, the term UE should be understood to encompass any wireless device 10. A wireless device 10 may also be referred to as a radio device, a radio communication device, a wireless device, a wireless terminal, or simply a terminal—unless the context indicates otherwise, the use of any of these terms is intended to include device-to-device UEs or devices, machine-type devices, or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices, although referred to as UEs, but may be configured to transmit and/or receive data without direct human interaction.

In some embodiments, the wireless device 10 includes a user interface 12 (display, touchscreen, keyboard or keypad, microphone, speaker, and the like); in other embodiments, such as in many M2M, MTC, or NB IoT scenarios, the wireless device 10 may include only a minimal, or no, user interface 12 (as indicated by the dashed lines of block 12 in FIG. 5). The wireless device 10 also includes processing circuitry 14; memory 16; and communication circuitry 18 connected to one or more antennas 20, to effect wireless communication across an air interface to one or more radio network nodes, such as a base station, and/or access points. As indicated by the dashed lines, the antenna(s) 20 may protrude externally from the wireless device 10, or the antenna(s) 20 may be internal. In some embodiments, a wireless device 10 may include a sophisticated user interface 32, and may additionally include features such as a camera, accelerometer, satellite navigation signal receiver circuitry, vibrating motor, and the like (not depicted in FIG. 5).

According to embodiments of the present invention, the memory 16 is operative to store, and the processing circuitry 14 operative to execute, software which when executed is operative to cause the wireless device 10 to perform network access signaling according to a temporal network access load distribution scheme, in which its opportunities to transmit network access signaling are limited. In particular, the software, when executed on the processing circuitry 14, is operative to perform the method 100 described and claimed herein. The processing circuitry 14 in this regard may implement certain functional means, units, or modules.

Figure 6:
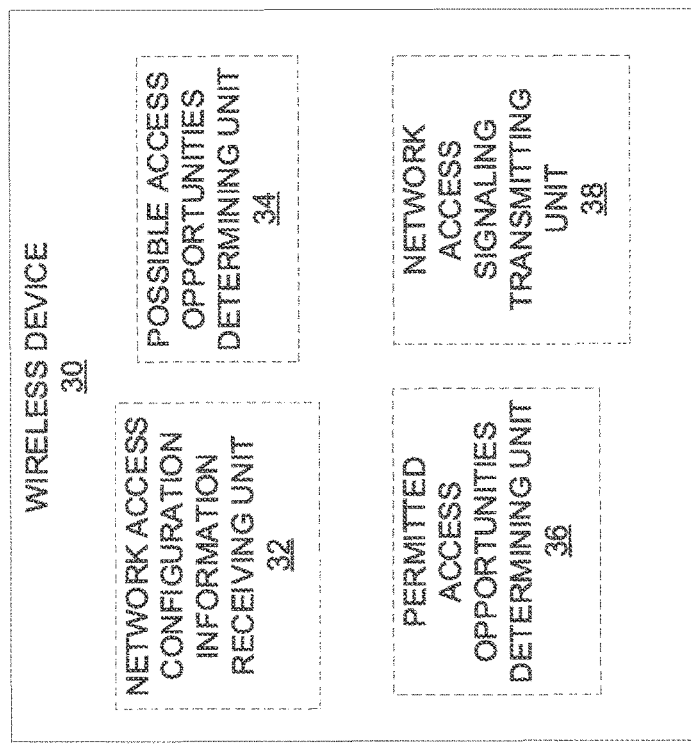
FIG. 6 is a block diagram of a wireless device showing functional units.

FIG. 6 illustrates a schematic block diagram of a wireless device 30 in a wireless network according to still other embodiments. As shown, the wireless device 30 implements various functional means, units, or modules, e.g., via the processing circuitry 14 in FIG. 5 and/or via software code. These functional means, units, or modules, e.g., for implementing the method(s) herein, include for instance: a network access configuration information receiving unit 32, a possible access opportunities determining unit 34, a permitted access opportunities determining unit 36, and a network access signalling transmitting unit 38.

The network access configuration information receiving unit 32 is configured to receive network access configuration information broadcast from the network. The possible access opportunities determining unit 34 is configured to determine a plurality of access opportunities, in the time domain, on which network access signalling is possible on the selected uplink carrier. The permitted access opportunities determining unit 36 is configured to, based on the network access configuration information and one of a parameter of the wireless device and a random parameter, determine a subset of the plurality of possible access opportunities in which the wireless device is permitted to transmit network access signalling on the selected uplink carrier. The network access signalling transmitting unit 38 is configured to transmit network access signalling on the selected uplink carrier only during the subset of permitted access opportunities. In some embodiments, the wireless device 30 further includes an uplink carrier selecting unit (not shown) configured to select an uplink carrier on which to transmit network access signalling.

Figure 7:
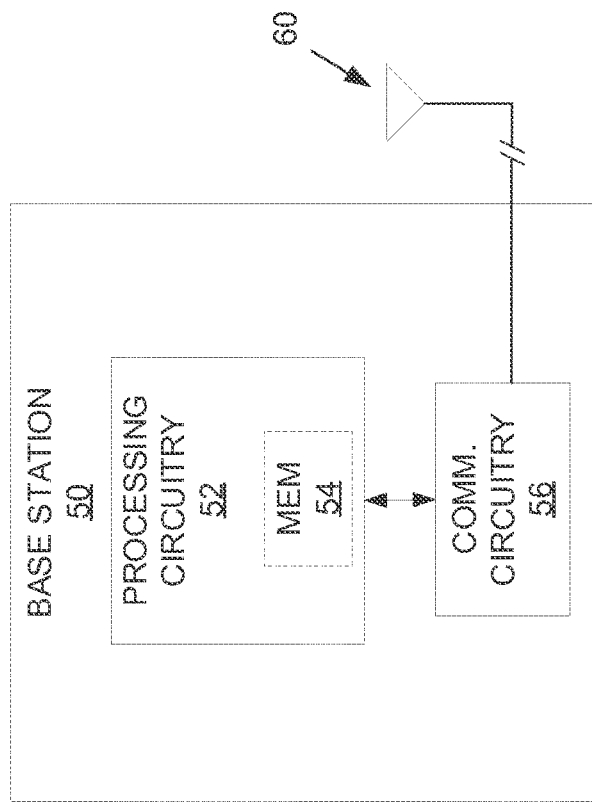
FIG. 7 is a block diagram of a base station.

FIG. 7 depicts a base station 50 operative in a wireless communication network. The base station 50 includes processing circuitry 52; memory 54; and communication circuitry 56 connected to one or more antennas 60, to effect wireless communication across an air interface to one or more wireless devices 10. As indicated by the broken connection to the antenna(s) 60, the antenna(s) 60 may be physically located separately from the base station 50, such as mounted on a tower, building, or the like. Although the memory 56 is depicted as being internal to the processing circuitry 54, those of skill in the art understand that the memory 56 may also be external. Those of skill in the art additionally understand that virtualization techniques allow some functions nominally executed by the processing circuitry 54 to actually be executed by other hardware, perhaps remotely located (e.g., in the so-called "cloud"). The base station 50 is known in LTE as a eNodeB or eNB, and in New Radio (NR) as gNB. In general, in other wireless communication networks, the base station 50 may be known as a Radio Base Station, Base Transceiver Station, Access Point, or the like.

According to one embodiment of the present invention, the processing circuitry 54 is operative to cause the base station 50 to perform temporal network access load distribution, by which network access attempts by wireless devices 10 on an uplink carrier are distributed in time, avoiding massive simultaneous access attempts. In particular, the processing circuitry 54 is operative to perform the method 200 described and claimed herein. The processing circuitry 54 in this regard may implement certain functional means, units, or modules.

Figure 8:
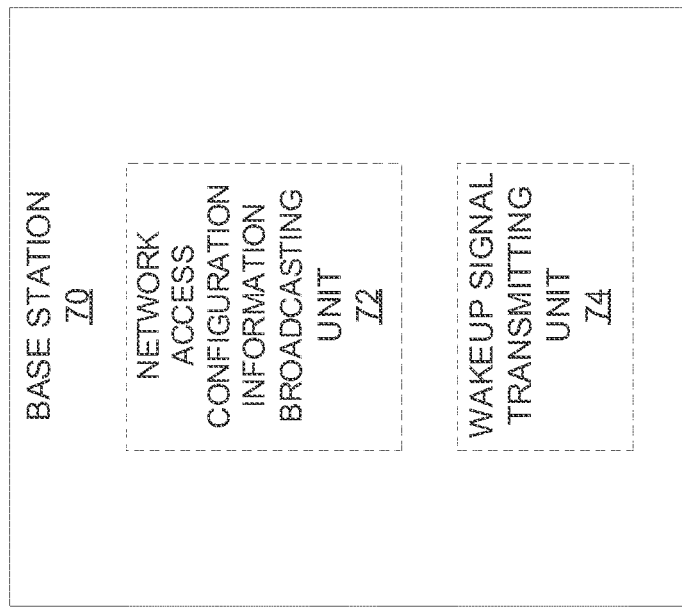
FIG. 8 is a block diagram of a base station showing functional units.

FIG. 8 illustrates a schematic block diagram of a base station 70 in a wireless network according to still other embodiments. As shown, the base station 72 implements various functional means, units, or modules, e.g., via the processing circuitry 52 in FIG. 7 and/or via software code. These functional means, units, or modules, e.g., for implementing the method 200 herein, include for instance: network access configuration information broadcasting unit 72 and network access signalling receiving unit 74.

The network access configuration information broadcasting unit 72 is configured to broadcast network access configuration information. The network access signalling receiving unit 74 is configured to receive, on the uplink carrier, network access signalling from the wireless device only during a subset of a plurality of possible access opportunities, in the time domain, in which the wireless device is permitted to perform access, the subset determined by the wireless device.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention provide numerous advantages over the prior art. The number of the simultaneous access attempts by MTC UEs is reduced, and consequently the maximal (N)PRACH load seen at the eNB is reduced. This prevents Random Access congestion, without the need for explicit signaling. Further, it lowers the processing requirements in eNB and the collision probability per access attempt, leading to reduced power consumption for the UE.

Although embodiments of the present invention are discussed herein with reference to LTE, NR, LTE-M, and NB-IoT, e.g., referring to UEs, (N)PRACH, and the like, the invention is not limited to these standardized wireless communication network protocols. Rather, embodiments of the present invention may be advantageously deployed in any wireless communication network in which a large number of wireless devices may attempt network access simultaneously, such as due to a commonly-experienced event, or due to common software. As such, those of skill in the art will understand that the claims are to be construed broadly—for example, the term "base station" encompasses any wireless network node that serves as an access point, or RAN terminal, for wireless communication with wireless devices. As used herein, the phrase "one of A and B" means the logical OR of A and B (as opposed to XOR), and is satisfied by one or more A without B, one or more B without A, or any number of A together with any number of B.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Over the Top Embodiments

Figure 9:
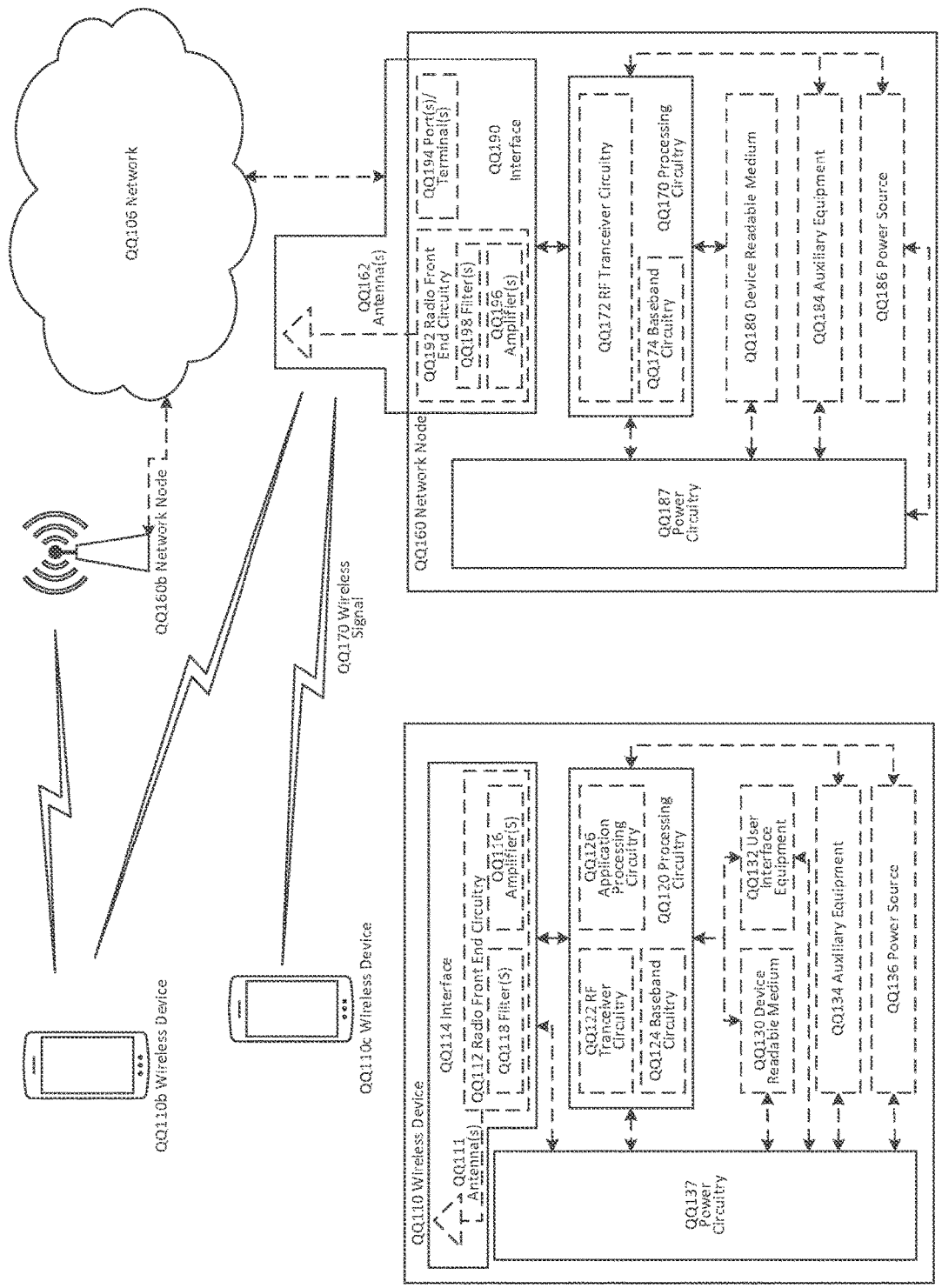
FIG. 9 is a block diagram of a network and some network components.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190.

In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 9 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 10:
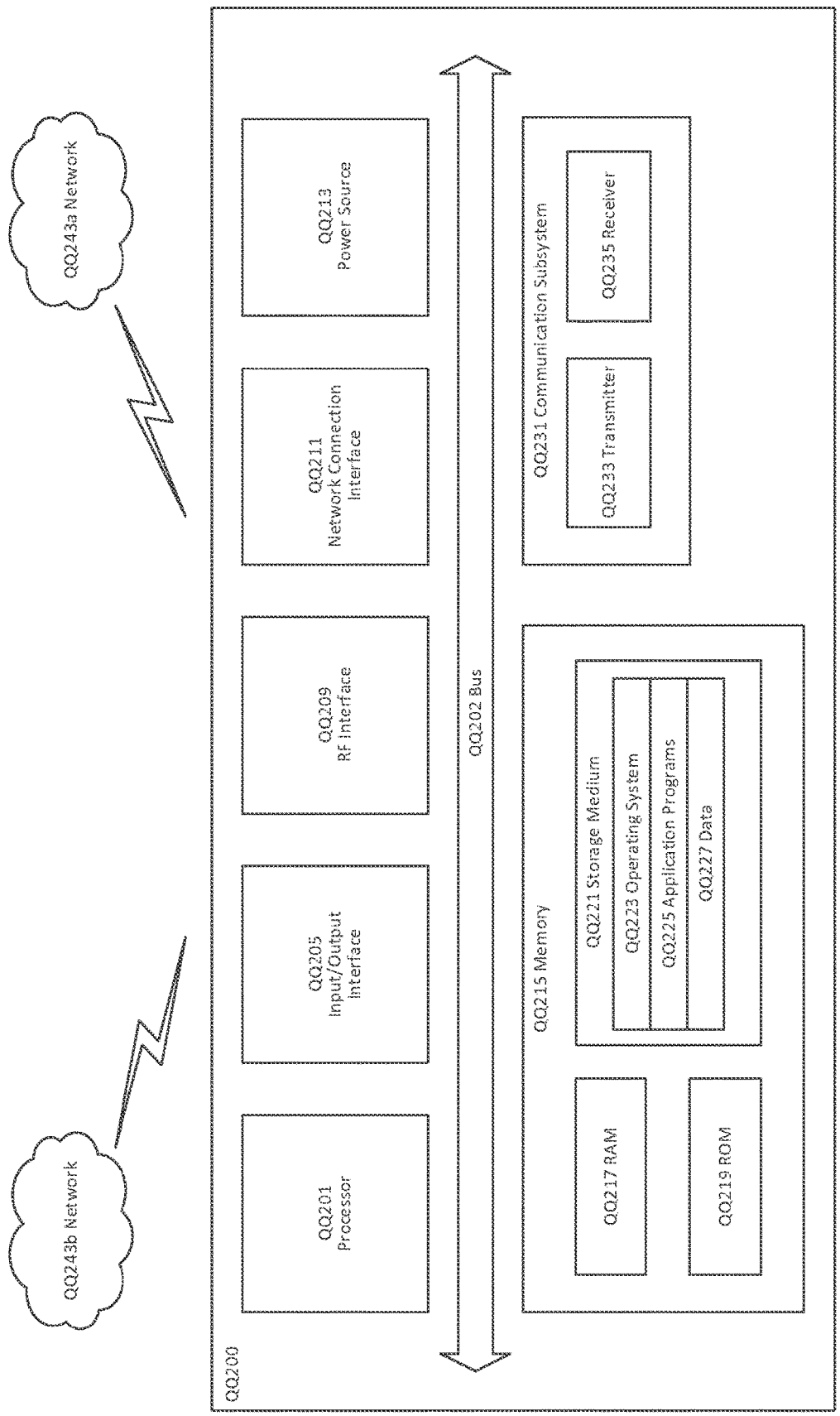
FIG. 10 is a block diagram of a User Equipment.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 10, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 11:
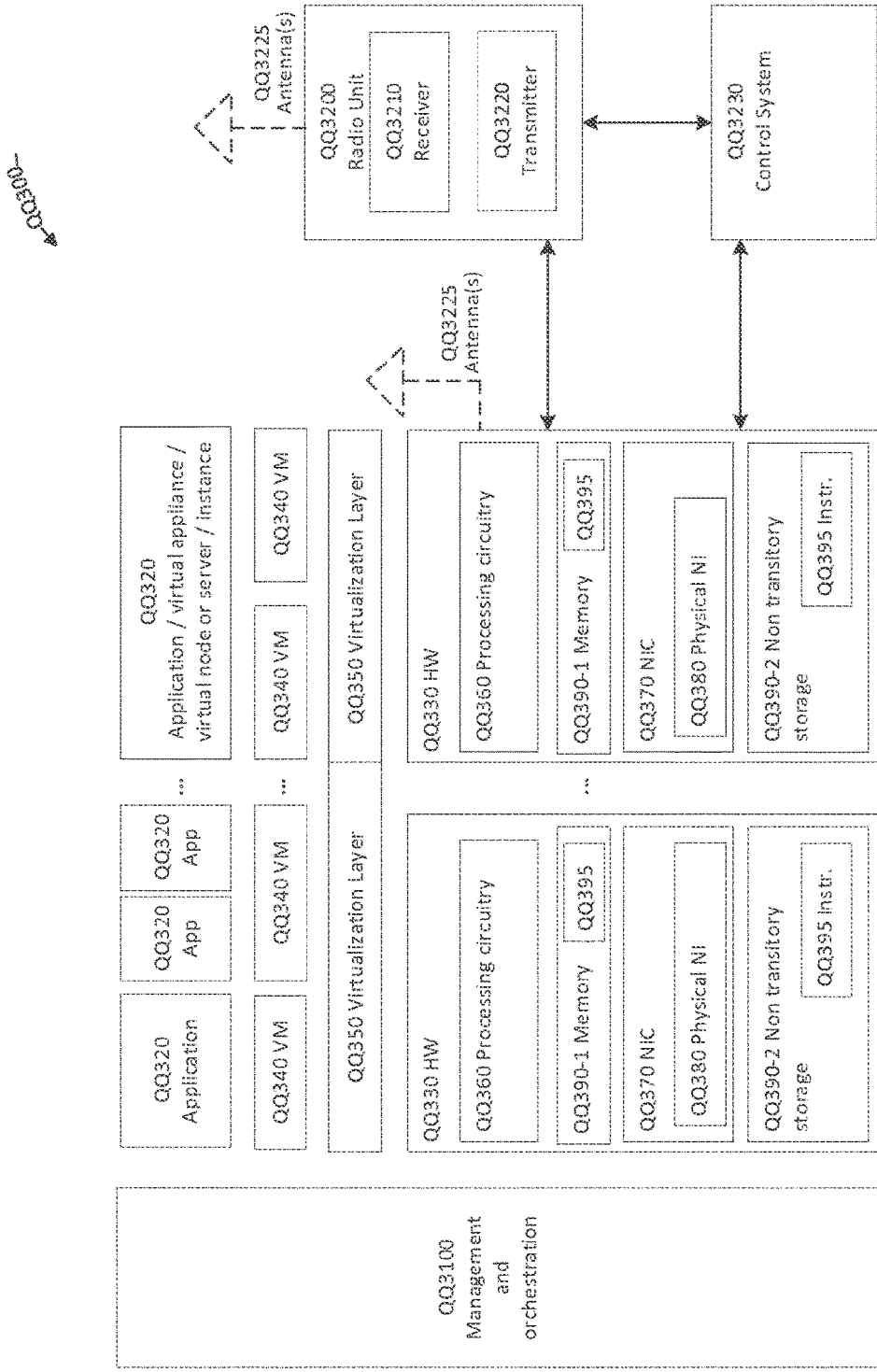
FIG. 11 is a schematic block diagram illustrating a virtualization environment.

FIG. 11 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 11, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 11.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 12:
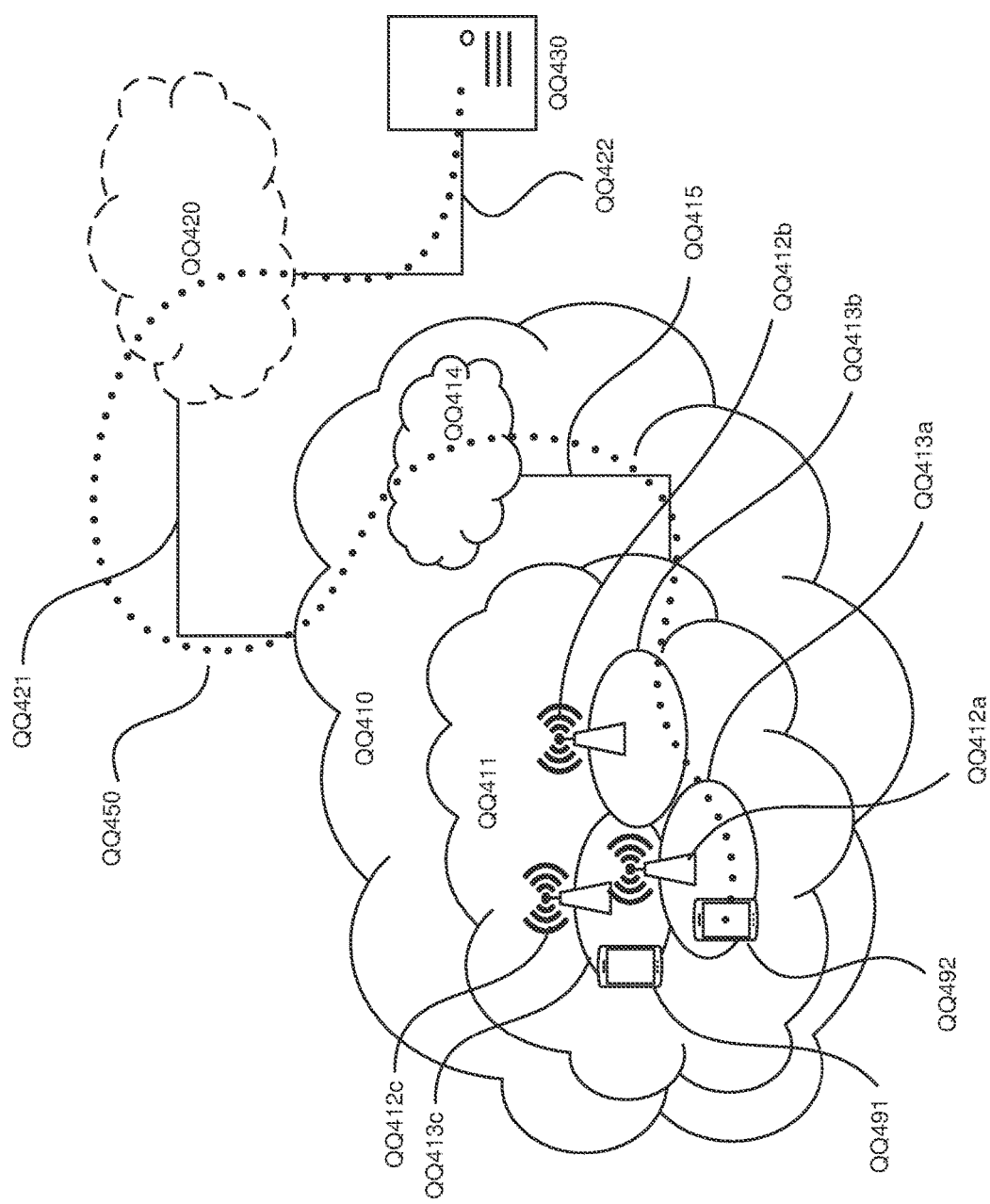
FIG. 12 illustrates a telecommunication network connected via an intermediate network to a host computer.

FIG. 12 illustrates a telecommunication network connected via an intermediate network to a host computer in accordance with some embodiments. In particular, with reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 13:
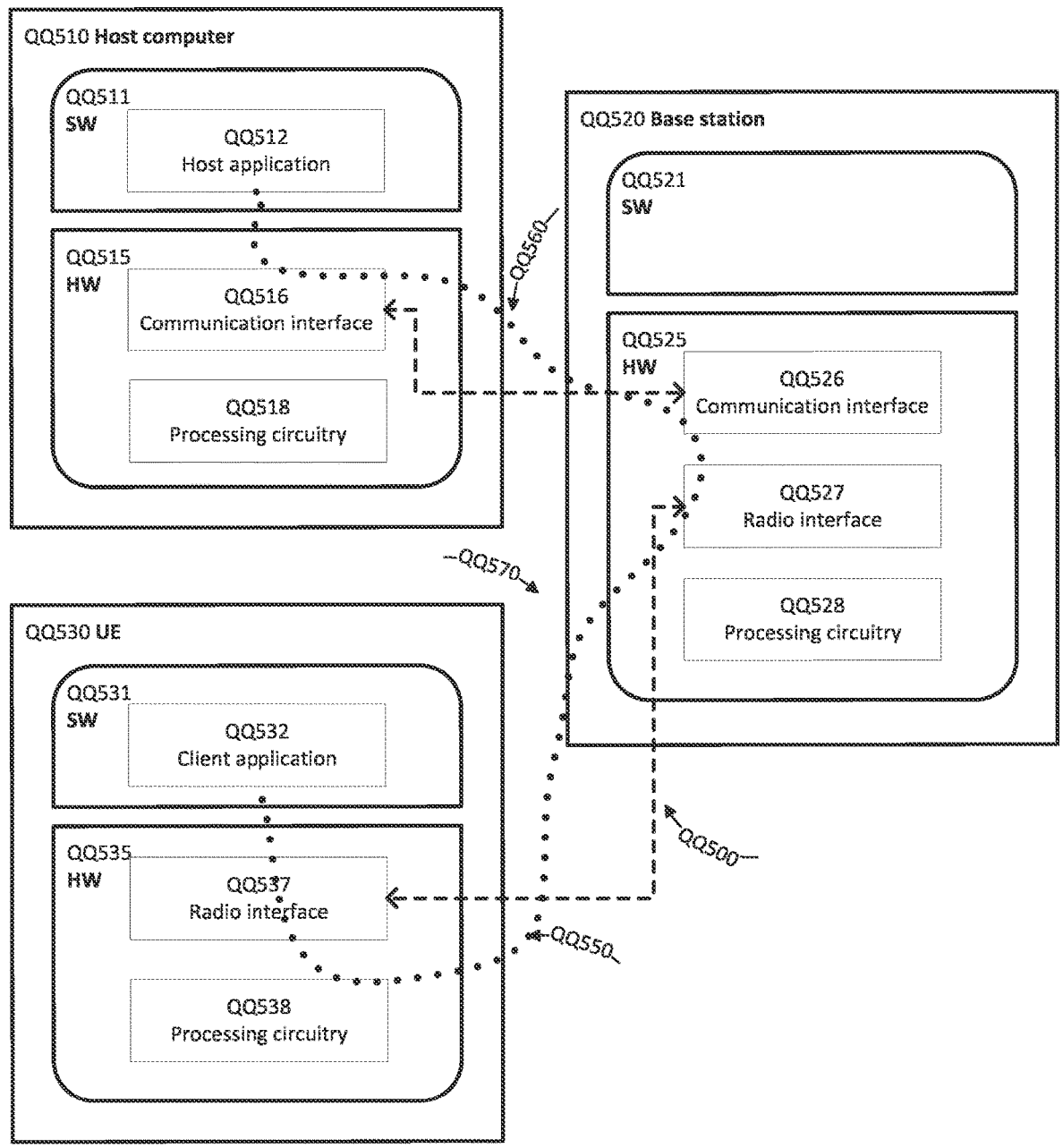
FIG. 13 illustrates host computer communicating via a base station with a user equipment over a partially wireless connection.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the network access performance and thereby provide benefits such as more orderly network access when large numbers of wireless devices attempt simultaneous access, thus reducing the instantaneous processing load at the base station, and preserving battery power in the wireless devices due to decreased repeated access attempts.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
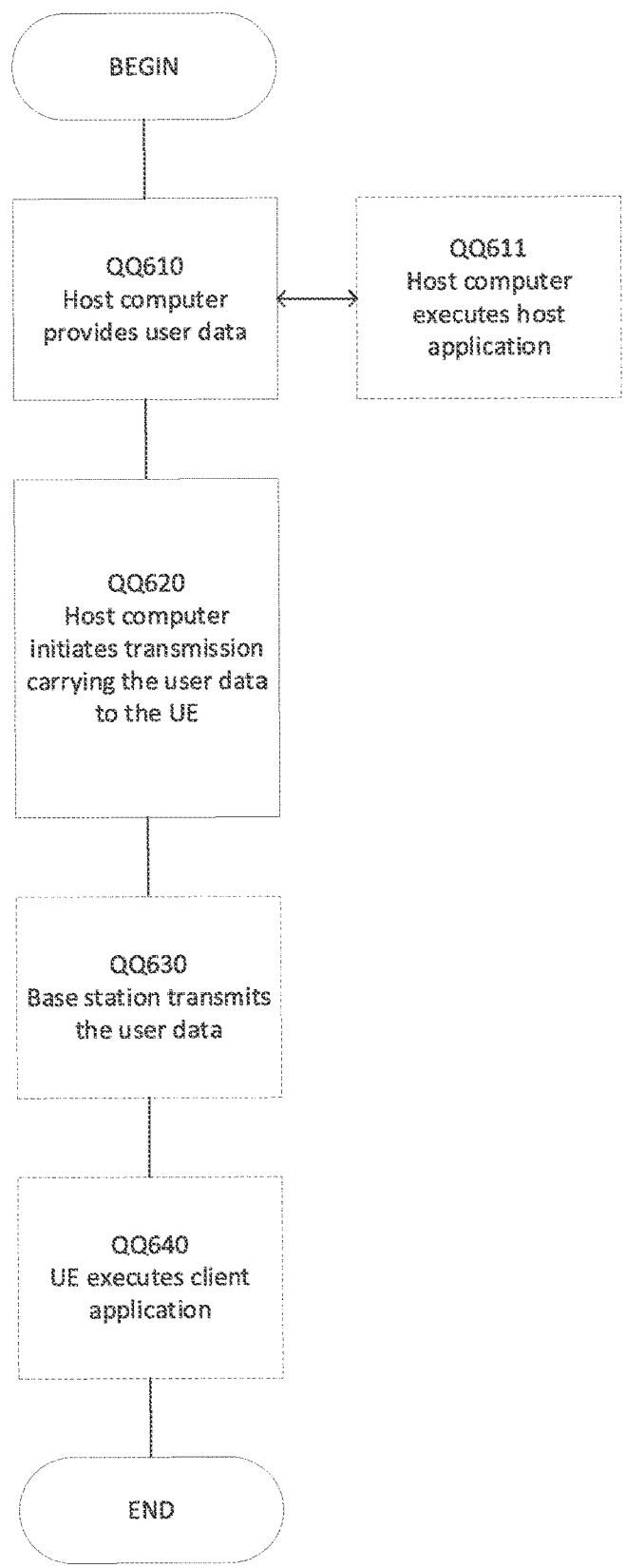
FIG. 14 is a flowchart illustrating a host computer communicating with a UE in a communication system.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
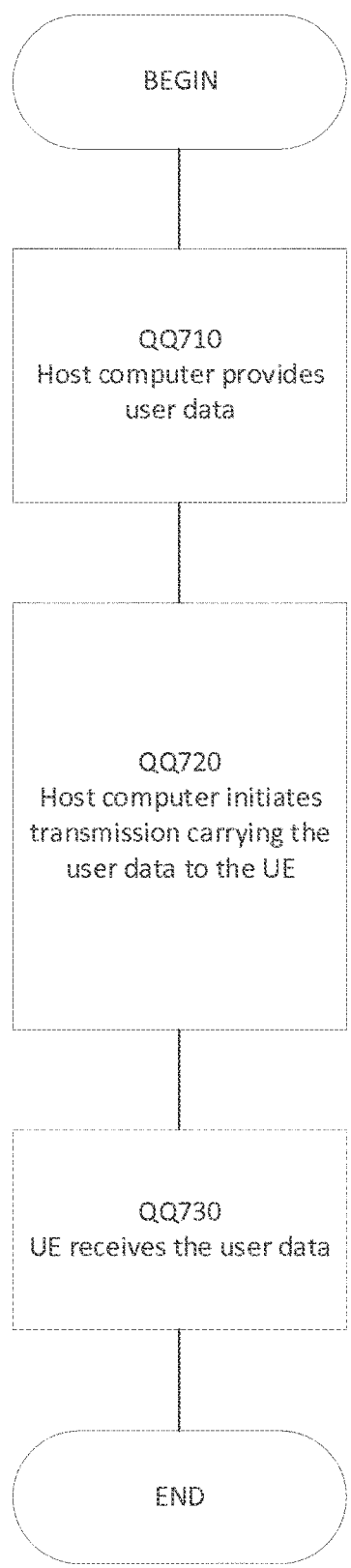
FIG. 15 is a flowchart illustrating a host computer communicating with a UE in a communication system.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
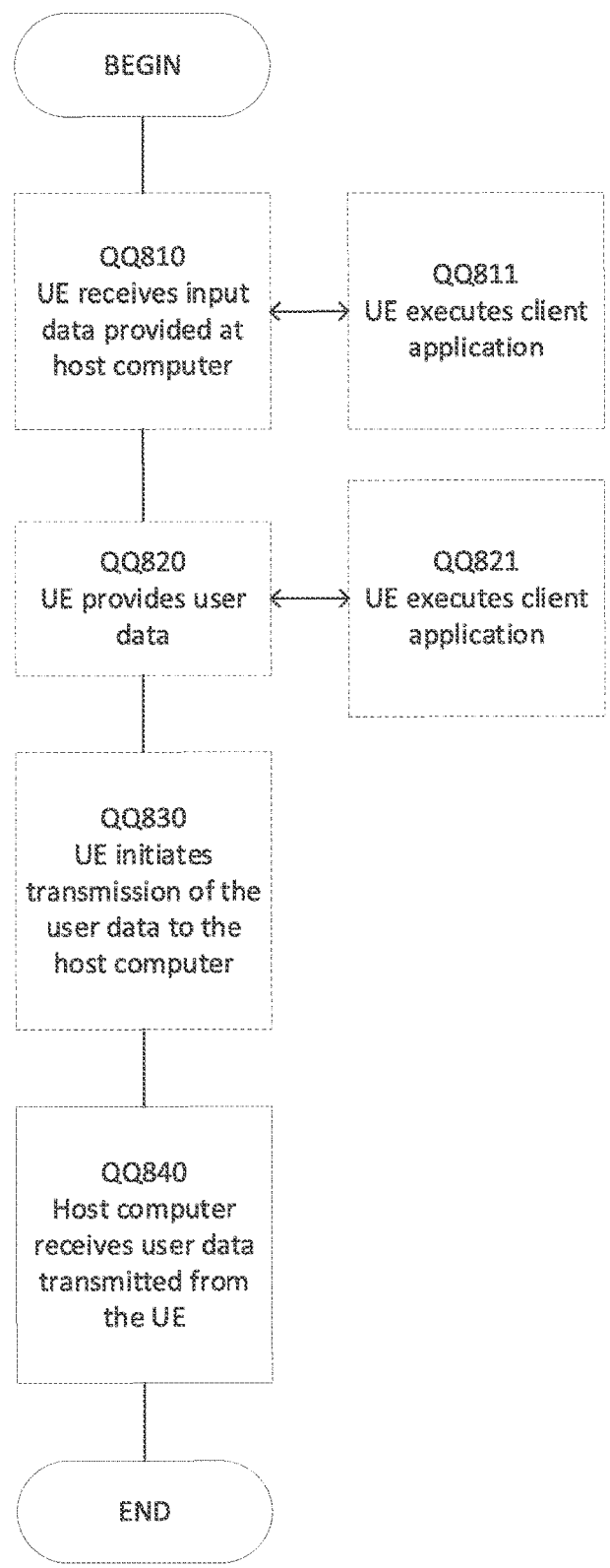
FIG. 16 is a flowchart illustrating a UE communicating with a host computer in a communication system.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
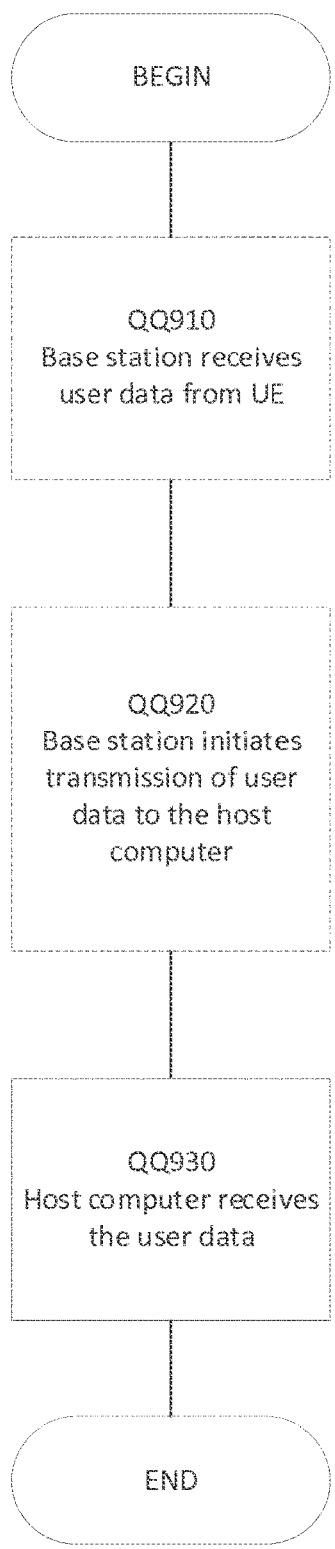
FIG. 17 is a flowchart illustrating communication between a base station and a host computer in a communication system.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following specific embodiments illustrate implementation of embodiments of the present invention in Over the Top embodiments, with reference to the claims:

Group A Embodiments include claims 1-8 and embodiment AA:

AA. The method of any of claims 1-8, further comprising:
  providing user data; and
  forwarding the user data to a host computer via the transmission to the base station.

Group B Embodiments include claim 17 and embodiment BB:

BB. The method of claim 17, further comprising:
  obtaining user data; and
  forwarding the user data to a host computer or a wireless device.

Group C Embodiments:

C1. A wireless device configured to perform any of the steps of any of the Group A embodiments.

C2. A wireless device comprising:
  processing circuitry configured to perform any of the steps of any of the Group A embodiments; and
  power supply circuitry configured to supply power to the wireless device.

C3. A wireless device comprising:
  processing circuitry and memory, the memory containing instructions executable by the processing circuitry whereby the wireless device is configured to perform any of the steps of any of the Group A embodiments.

C4. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising:
  processing circuitry configured to perform any of the steps of any of the Group B embodiments;
  power supply circuitry configured to supply power to the wireless device.

C9. A base station comprising:
  processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments:

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application;
and the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

The invention claimed is:

1. A method, performed by a wireless device for performing a temporally distributed network access procedure on an uplink carrier to access a wireless communication network, the method comprising:
receiving network access configuration information broadcast from the network;
based only on the broadcast network access configuration information, determining a plurality of access opportunities, in the time domain, on which network access signalling is possible on the uplink carrier;
based on the network access configuration information and a parameter unique to the wireless device, wherein the parameter is configured independently of the network, determining a subset of the plurality of possible access opportunities in which the wireless device is permitted to transmit network access signalling on the uplink carrier, such that the network is unaware of the determined subset; and transmitting network access signalling on the uplink carrier only during the subset of permitted access opportunities.

2. The method of claim 1 wherein determining a subset of the plurality of possible access opportunities in which the wireless device is permitted to transmit network access signalling comprises:
dividing the plurality of possible access opportunities into a plurality of subsets of access opportunities; and
selecting one of the subsets of access opportunities as a subset of the plurality of possible access opportunities on which the wireless device is permitted to transmit network access signalling.

3. The method of claim 2 wherein selecting one of the subsets of access opportunities as a subset unique to the plurality of possible access opportunities in which the wireless device is permitted to transmit network access signalling comprises performing an operation on a parameter unique to the wireless device to yield an index mapping the wireless device to one of the subsets of access opportunities.

4. The method of claim 3 wherein performing an operation on a parameter unique to the wireless device comprises calculating ID mod n=m, where
ID is a unique identifier of the wireless device;
n is a number of the plurality of subsets of access opportunities; and
m is an index identifying one of the n subsets of access opportunities.

5. The method of claim 1 wherein determining a subset of the plurality of possible access opportunities in which the wireless device is permitted to transmit network access signalling comprises:
dividing all uplink frame time periods into a predetermined number n of subsets;
selecting an index defining one of the n subsets based on a parameter unique to the wireless device; and
determining the subset of the plurality of possible access opportunities in which the wireless device is permitted to transmit network access signalling to be all access opportunities within occurrences of the selected index of uplink frame time periods.

6. The method of claim 5 wherein dividing all uplink frame time periods into a predetermined number n of subsets comprises computing
SFN mod n=m where
SFN is a Subframe Number of uplink subframes;
n is the predetermined number of subsets of subframes; and
m is an index identifying one of the n subsets of subframes.

7. The method of claim 1 further characterized by:
determining a coverage enhancement (CE) requirement;
selecting a network access CE level based on the CE requirement; and
wherein determining a subset of the plurality of possible access opportunities in which the wireless device is permitted to transmit network access signalling comprises determining a subset of the plurality of possible access opportunities based on the selected network access CE level.

8. The method of claim 7 wherein determining a CE requirement comprises:
measuring a Reference Signal Received Power (RSRP); and
determining a CE requirement based on the RSRP and an RSRP threshold received in System Information broadcast by the network.

9. A wireless device operative to perform a temporally distributed network access procedure on an uplink carrier to access a wireless communication network, comprising:
communication circuitry; and
processing circuitry operatively connected to the communication circuitry, and operative to receive network access configuration information broadcast from the network;
based only on the broadcast network access configuration information, determine a plurality of access opportunities, in the time domain, in which it is possible to transmit network access signalling on the uplink carrier;
based on the network access configuration information and a parameter unique to the wireless device, wherein the parameter is configured independently of the network, determine a subset of the plurality of possible access opportunities in which the wireless device is permitted to transmit network access signalling on the uplink carrier, such that the network is unaware of the determined subset; and
transmit network access signalling on the uplink carrier only during the subset of permitted access opportunities.

10. The wireless device of claim 9 wherein the processing circuitry is operative to determine a subset of the plurality of possible access opportunities in which the wireless device is permitted to transmit network access signalling by:
dividing the plurality of possible access opportunities into a plurality of subsets of access opportunities; and
selecting one of the subsets of access opportunities as a subset of the plurality of possible access opportunities on which the wireless device is permitted to transmit network access signalling.

11. The wireless device of claim 10 wherein selecting one of the subsets of access opportunities as a subset of the plurality of possible access opportunities in which the wireless device is permitted to transmit network access signalling comprises performing an operation on a parameter unique to the wireless device to yield an index mapping the wireless device to one of the subsets of access opportunities.

12. The wireless device of claim 11 wherein performing an operation on a parameter unique to the wireless device comprises calculating ID mod n=m, where
ID is a unique identifier of the wireless device;
n is a number of the plurality of subsets of access opportunities; and
m is an index identifying one of the n subsets of access opportunities.

13. The wireless device of claim 9 wherein the processing circuitry is operative to determine a subset of the plurality of possible access opportunities in which the wireless device is permitted to transmit network access signalling by:
dividing all uplink frame time periods into a predetermined number n of subsets;
selecting an index defining one of the n subsets based on a parameter unique to the wireless device; and
determining the subset of the plurality of possible access opportunities in which the wireless device is permitted to transmit network access signalling to be all access opportunities within occurrences of the selected index of uplink frame time periods.

14. The wireless device of claim 13 wherein dividing all uplink frame time periods into a predetermined number n of subsets comprises computing SFN mod n=m where SFN is a Subframe Number of uplink subframes;

n is the predetermined number of subsets of subframes; and m is an index identifying one of the n subsets of subframes.

15. The wireless device of claim 9 wherein the processing circuitry is further operative to:

determine a coverage enhancement (CE) requirement;

select a network access CE level based on the CE requirement; and wherein the processing circuitry is operative to determine a subset of the plurality of possible access opportunities in which the wireless device is permitted to transmit network access signalling by determining a subset of the plurality of possible access opportunities based on the selected network access CE level.

16. The wireless device of claim 15 wherein determining a CE requirement comprises:

measuring a Reference Signal Received Power (RSRP); and determining a CE requirement based on the RSRP and an RSRP threshold received in SI.

17. A method of temporal network access load distribution, performed by a base station operative in a communication network in which a wireless device seeks access to the network on an uplink carrier, the method comprising:

broadcasting network access configuration information; and receiving, on the uplink carrier, network access signalling from the wireless device only during a subset of a plurality of possible access opportunities, in the time domain, in which the wireless device is permitted to perform access, the subset determined solely by the wireless device, based only on the broadcast network access configuration information and a parameter unique to the device, wherein the parameter is configured independently of the network, such that the base station is unaware of the determined subset.

18. A base station operative in a communication network in which a wireless device seeks access to the network on an uplink carrier, and further operative to perform temporal network access load distribution, comprising:

communication circuitry; and processing circuitry operatively connected to the communication circuitry, and operative to broadcast network access configuration information; and receive, on the uplink carrier, network access signalling from the wireless device only during a subset of a plurality of possible access opportunities, in the time domain, in which the wireless device is permitted to perform access, the subset determined solely by the wireless device based only on the broadcast network access configuration information and a parameter unique to the wireless device, wherein the parameter is configured independently of the network, such that the base station is unaware of the determined subset.

* * * * *